3,556,989
HYDROCARBON OIL TREATMENT PROCESS AND
APPARATUS THEREFOR
James A. Weber, Uravan, Colo., Lester M. Rapp, Baton
Rouge, La., and Norman C. Stewart, Kendall Park,
N.J., assignors to Cities Service Research and Development Company, New York, N.Y., a corporation of Delaware
Filed Jan. 14, 1969, Ser. No. 790,941
Int. Cl. C10g 23/06
U.S. Cl. 208—143                3 Claims

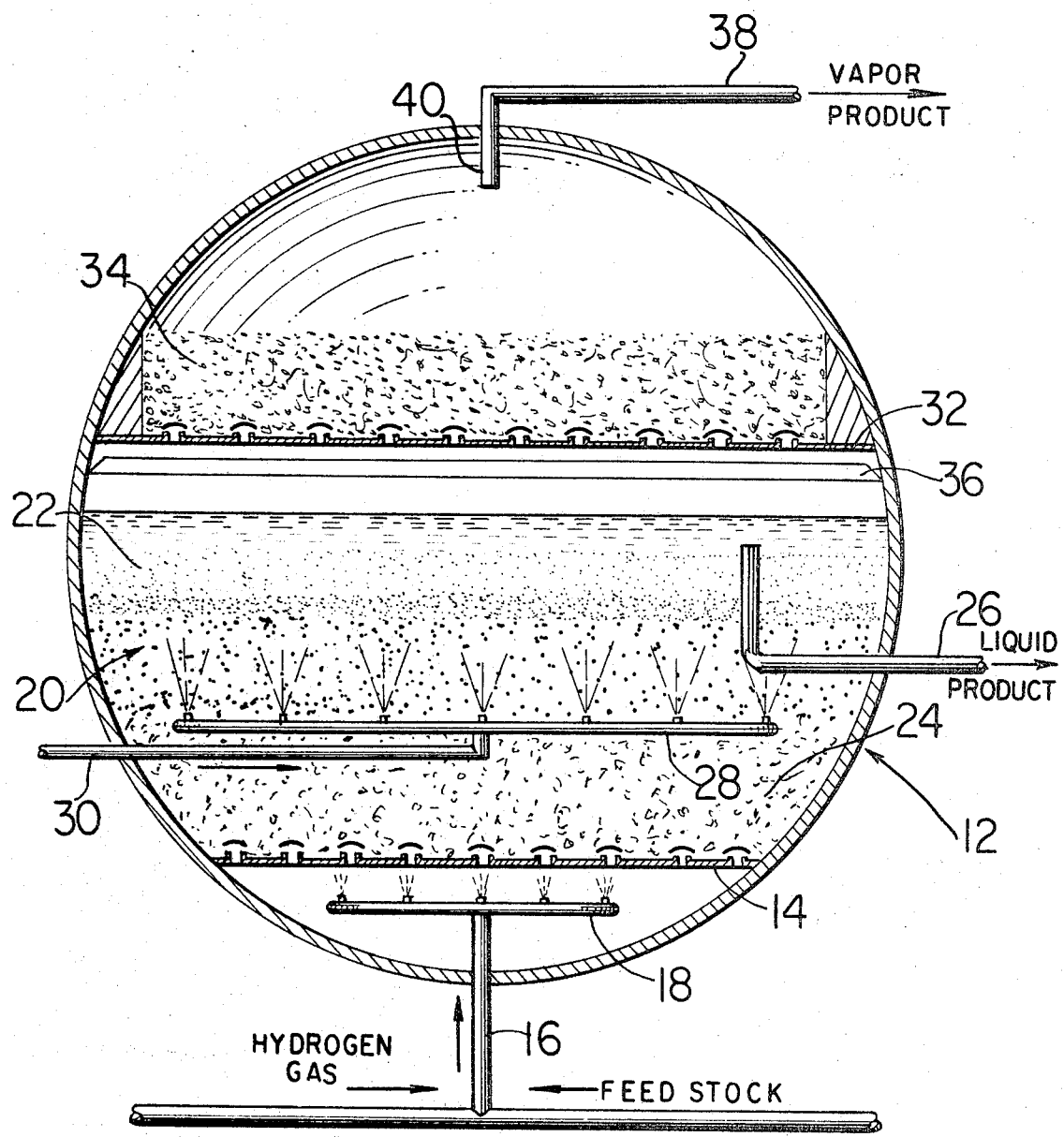

ABSTRACT OF THE DISCLOSURE

A process for the hydrotreating of hydrocarbon oil and the apparatus therefor are disclosed herein. The process comprises feeding a heavy hydrocarbon oil feed and a hydrogen containing gas into the bottom of a high pressure, high temperature spherical reactor vessel, passing the oil and gas upwardly through an expanded particulate catalyst bed in the lower half of the vessel thereby rapidly decreasing the upward velocity of the upwardly flowing gas and oil and removing the treated hydrocarbon oil at a rate sufficient to maintain the upper level of the liquid hydrocarbon oil approximately at the midpoint of the spherical vessel. Preferably vapor product is passed upwardly in the vessel through a second fixed catalyst bed for additional hydrotreating prior to being withdrawn from the vessel. The vessel comprises a spherical shell having a horizontal grid mounted in the lower part of the shell on which an expandable particulate catalyst is supported. A feed conduit for passing hydrocarbon oil feedstock and hydrogen containing gas is connected to the bottom of the vessel and opens into the vessel below the grid. A liquid drawoff conduit is connected to the vessel and opens below the midpoint of the vessel, and preferably above the level of the expanded catalyst bed. A second horizontal grid is horizontally mounted in the upper half of the spherical vessel and acts to support a fixed catalyst bed for hydrotreating hydrocarbon vapor. A vapor effluent withdrawal conduit is connected to and opens into the reactor above the fixed catalyst bed.

BACKGROUND OF THE INVENTION

This invention relates to the high pressure, high temperature, hydrotreating of petroleum oils. More particularly this invention relates to the two step hydrogenation at high pressure and temperature of a heavy hydrocarbon oil in the presence of an expanded particulate catalyst bed.

Hydrotreating of petroleum oils, particularly at high pressures and temperatures, has become increasingly important and useful. Principally, hydrogenation is used to upgrade and desulfurize heavy hydrocarbon oil fractions and various natural or synthetic crude oils. More attention lately has been directed to the deep hydrogenation of the heavy hydrocarbon oils containing bottoms or residuum. It has been found that the use of upflow, fully backmixed type processes utilizing either an expanded particulate catalyst bed such as described in U.S. Pat. No. Re. 25,770 issued Apr. 27, 1965 to E. S. Johanson for Gas-Liquid Contacting Process, or one utilizing fine fluidized catalyst particles at high pressures and temperatures is particularly attractive.

Generally reactors for use with such upflow catalytic hydrogenation treatment of a heavy hydrocarbon oil have been cylindrically shaped with a uniform cross-section over substantially the whole length of the reactor. A hydrocarbon oil is passed into the bottom of the cylindrical reactor together with large volumes of hydrogen and possibly a small proportion of particulate catalyst and the mixture caused to flow generally in an upward direction, expanding the particulate catalyst and obtaining an "ebullated bed" as in the process described in the aforementioned U.S. Pat. No. Re. 25,770. In such ebullated bed processes the catalyst bed is expanded by the overall upflow velocity of the fluids in the cylinder so that the bed generally expands to occupy almost the same volume as occupied by the liquid phase of the reactants.

When operating the above process and utilizing fine particulate cataylst in the range of from about 40 microns to about 400 microns it has been found difficult to retain catalyst particles and provide for efficient gas-liquid separation in the reactor. That is, within the operational parameters of upward fluid velocities, particularly at the solids-liquid and gas-liquid separation levels, there is some difficulty in; (1) retaining the fine particulate catalyst in the liquid phase; (2) preventing particles from being carried out of the reactor with the liquid effluent; (3) preventing liquid entrainment in the gaseous effluent; and, (4) gaseous entrainment in the liquid phase. One solution is to maintain a large enough disengaging height between the liquid and catalyst level in the reactor, and between the liquid level and the gaseous effluent drawoff conduit. The disadvantage of such a solution is the loss of reactor volume necessitated by the greater disengagement heights. High pressure, high temperature reactors are extremely expensive items of capital equipment and of necessity it is desirable to obtain a reactor which will process as large as possible a quantity of oil for a specific reactor volume.

SUMMARY OF THE INVENTION

We have invented a novel process for the deep hydrogenation of hydrocarbon liquid, and apparatus for practicing the process. The process comprises feeding hydrocarbon liquid and a hydrogen containing gas into the bottom of spherically shaped high temperature, high pressure zone, passing the liquid and gas upwardly in said zone through an expanded particulate catalyst bed in the lower half of the zone, while rapidly and simultaneously decreasing the upward velocity of the upwardly flowing gas and liquid mixture, and removing the treated hydrocarbon liquid at a rate sufficient to maintain the upper level of the hydrocarbon liquid approximately at the mid-point of the spherical zone. Preferably, the upwardly flowing gas and vapor product is passed upwardly in the spherical zone through a second fixed particulate catalyst bed, and subjected to additional hydrotreating before being withdrawn from the zone. The apparatus includes a spherical vessel and a horizontal grid mounted in the lower part of the vessel on which an expandable particulate catalyst bed is supported. Feed means for passing hydrocarbon oil feedstock and a hydrogen containing gas into the vessel is communicatingly connected to the bottom of the vessel below the grid, and a liquid draw-off conduit is communicatingly connected to the vessel and opens at a point adjacent and below the mid-point of the vessel, preferably above the level of the expanded catalyst bed. A second horizontally mounted grid is attached to the interior of the shell of the spherical vessel above the midpoint thereof and acts to support a fixed catalyst bed and a vapor effluent withdrawal conduit is communicatingly connected to the reactor above the fixed catalyst bed.

Accordingly it is an object of this invention to provide a process for the deep hydrogenation of a heavy hydrocarbon oil.

It is another object of this invention to provide a novel process for the two-stage hydrogenation and hydrotreating of the heavy hydrocarbon oil.

It is still another object of this invention to provide a process wherein improved catalyst-liquid disengagement and vapor-liquid separation is obtained.

It is yet another object of this invention to provide an apparatus for the efficient high pressure, high temperature hydrotreating of a hydrocarbon oil.

Yet, another object of this invention is to provide an apparatus embodying a novel reactor geometry for the hydrogenation, hydrocracking and hydrodesulfurization of a heavy hydrocarbon oil, and for the hydrofinishing of the vapor product from said hydrogenation, hydrocracking and hydrodesulfurization.

Other objects and advantages of this invention will be apparent to those skilled in the art from the drawings and description of the preferred embodiments which follow.

BRIEF DESCRIPTION OF THE DRAWING

The drawing shows an elevation view of the reactor vessel of the present invention.

BRIEF DESCRIPTION OF THE PREFERRED EMBODIMENT

With reference to the drawing, a high pressure, high temperature spherical reactor vessel 12 is shown. The vessel 12 is constructed either from steel plate, or rings and is able to withstand safely pressures of up to about 10,000 p.s.i. and temperatures of up to 1500° F. A transversely mounted grid 14 is fixedly mounted to the internal walls of the spherical vessel 12 in the bottom portion thereof. The grid 14 is preferably located substantially below the mid-point of the vessel and preferably below a point at least ½ way up to the mid-point of the vessel. The grid is of conventional construction such as the bubble cap tray, and serves the purpose of uniformly distributing fluid passing therethrough over the whole cross-sectional area covered by the grid. Additionally, the grid may be also designed to prevent reverse flow of solid and/or liquid materials into that portion of the vessel below the grid. Finally, while only one traverse grid is described and shown herein as located below the mid-point of the vessel, it should be understood that a number of grids of the same or different types may be sequentially placed in the lower half of the vessel for distribution or other purposes.

A feed conduit 16 is communicatingly connected to the lower portion of the vessel 12 below the grid 14. Heavy hydrocarbon oil feedstock, hydrogen gas and if desired, fresh fine particulate catalyst are passed via the feed conduit 16 into a horizontally mounted distributor ring 18, also located below the grid 14 and communicatingly connected to the feed conduit 16. The heavy hydrocarbon oil feedstock is preferably but not necessarily petroleum oil boiling above 650° F. and may include, for instance, heavy gas-oil, cycle oil, crude oil, synthetic crude oils, vacuum and atmospheric residuums and other relatively high boiling petroleum oil stocks for which hydrotreating is a preferred treatment. The advantages obtained from hydrotreating the above feedstocks include, for instance, hydrogenation, reduction of olefin content, thermal cracking and saturation of aromatic, desulfurization and denitrogenation. The hydrogen which is supplied to the process via the feed conduit 16 is usually in the form of gaseous stream containing other constituents such as carbon oxides, nitrogen, methane, ethane and steam, and may be in any desired amount and at any desired partial pressure. The hydrogen gas is generally supplied at a rate of from about 250 to about 50,000 standard cubic feet (s.c.f.) of hydrogen per barrel of feedstock, and is at a partial pressure of from 500 p.s.i.g. to about 5000 p.s.i.g. Preferably, hydrogen gas, which may be recycle gas containing light hydrocarbons obtained from a refinery source is supplied in the amount of from about 500 to about 10,000 s.c.f. of hydrogen per barrel of feedstock at a partial pressure of between about 1500 p.s.i.g. and about 3000 p.s.i.g.

Additionally, fresh particulate catalyst may be supplied via the feed conduit 16 to the lower portion of the reactor vessel 12. A fresh particulate catalyst may be supplied either continually or intermittantly as desired in order to maintain the amount of catalyst in the reactor at a suitable constant activity and concentration level. The particulate catalyst supplied to and maintained in the reactor vessel 12 forms an expanded ebullated catalyst bed 20 which is maintained in a state of random motion by the upwardly flowing reactant fluids and gas and establishes a relatively diffuse upper level 22 which may be described as being composed of a dilute catalyst phase located above a dense catalyst phase 24 in the lower portion of the vessel. Spent catalyst may be withdrawn either through a liquid drawoff conduit 26 or, if desired, by other means such as a separate catalyst withdrawal conduit, not shown. Catalysts suitable for use in the reactor vessel 12 of the invention are any form of finely divided particulate catalyst, preferably in the size range of from 40 to about 400 microns. Particulate catalysts for use in catalyzing liquid and gaseous reactions are well known in the art and are referred to as heterogeneous catalysts to indicate that they are utilized in a different state, i.e., solid, than the reactants. Examples of suitable catalysts for use in treating hydrocarbon oils with hydrogen are clays, alumina, silica, platinum, silica-alumina base impregnated with one or more of the transitional metals such as nickel, cobalt, manganese, iron, vanadium, etc., and their oxides or sulfides.

Also mounted in the reactor vessel below the mid-point thereof, and above the distribution grid 14 is a secondary distributor 28 which is horizontally mounted in the vessel. The secondary distributor 28 is communicatingly connected to a hydrogen gas feed conduit 30 which passes through the walls of the spherical vessel 12 to a hydrogen gas source, not shown, and serves to add cool hydrogen if desired for quenching purposes.

Above the mid-point of the vessel 12 a second horizontally mounted upper grid 32 is fixedly attached to the inside walls of the vessel and covers the whole cross-sectional area thereof. The upper grid 32 which is of any desired conventional construction acts to support a fixed particulate catalyst bed 34 within the vessel 12. The catalyst supported above the upper grid may be any suitable catalyst for hydrogenation of hydrocarbon materials at high pressure and temperature. Those catalysts described as suitable for use in the ebullated catalyst bed 20 in the lower half of the vessel, are also suitable for use in the fixed bed 34 supported by the upper grid 32. It should of course be understood that any suitable conventional catalyst is contemplated for use with the process and apparatus of this invention and not only those described herein. A demister 36 is transversely mounted within the vessel just below the second upper grid 32 and acts to remove liquid particles from the vapor which passes therethrough into the fixed catalyst bed 34. Finally, a vapor product withdrawal conduit 38 is communicatingly connected to the vessel 12 and opens at a point 40 within the upper portion of the vessel, preferably near the top thereof.

The feedstock, consisting essentially of a heavy hydrogen feedstock such as those described above, a hydrogen containing gas and possibly finely divided particulate catalyst are passed into the reactor vessel 12 via the feed conduit 16 at a rate sufficient to establish and maintain an upward superficial gas velocity across the cross-sectional area at the mid-point of the vessel of not more than 0.15 ft./sec. to provide for practical gas-liquid disengagement at the liquid-gas interface, and preferably for a superficial gas velocity of about 0.09 ft./sec. at that point. It is readily apparent that the cross-sectional area across the mid-point of the vessel is larger than any point below or above it. It is also apparent that the horizontal cross-sectional area of the vessel rapidly increases from the bottom of the vessel until a point about ⅓ up the total height of the vessel and thereafter increases at a lesser rate. It would, therefore, follow from this point that the highest flow velocities for both the liquid and the gaseous reactants occurs across the smallest cross-sectional area of the vessel. Fluid flow velocities in the lower half of the reactor vessel would therefore decrease as the fluid passes upward in the vessel and reach a minimum at the midpoint of the spherical vessel. By maintaining the gas-liquid interface at the mid-point, liquid entrapment in the gas is minimized and the gas liquid disengagement height therefore is also minimized.

For adequate gas-liquid disengagement at the gas-liquid interface, a superficial gas velocity of 0.15 ft./sec. or less is necessary while for adequate back mixing and hydrogenation a superficial gas velocity of at least 0.20 ft./sec. is required, with the preferred range being from 0.20 to 0.50 ft./sec. For a spherical reactor vessel 12 having the lower transverse grid 14 mounted above the vessel bottom equal to one eighth of the vessel diameter and having a maximum superficial gas velocity of 0.15 ft./sec. midway through the vessel, the superficial gas velocity is 0.34 ft./sec. at the lower grid, and 0.20 ft./sec. midway between the lower grid and the middle of the vessel. The aforesaid results are illustrative of the advantages of using a spherical hydrotreating vessel in a process for hydrocracking a hydrocarbon oil by passing the oil upwardly through an expanded particulate catalyst bed located in the lower portion of the vessel, then separating the gases and liquid hydrocarbons at the middle of the vessel, withdrawing the liquid hydrocarbon product, and hydrotreating the gaseous material in a fixed bed in the upper portion of the vessel. As it is necessary to carry out the hydrotreating process at pressures above 1500 p.s.i.g. and temperatures above 650° F., it is readily apparent that a spherical reactor vessel can be built at a lesser cost based on required wall thickness than the equivalent volume, cylindrically shaped vessel. Finally a liquid flow rate in the range of from 4 to 10 gallons per minte per square foot of cross-section is desired in the expanded ebullated catalyst bed 20 of the vessel 12.

With the view of further illustrating the process of this invention but not as limitation thereon the following example is given.

32,500 barrels per day (b.p.d.) of vacuum residuum together with 6000 s.c.f. of hydrogen per barrel of fresh feed is passed into the reaction vessel via feed conduit 16. The reactor vessel 12 is maintained at a temperature of 850° F. and a pressure of 3000 p.s.i.g. The reactor vessel 12 has an internal diameter of 20 feet. The lower grid 14 is mounted at a level 2.5 feet above the inside bottom of the vessel and the gas-liquid interface is located at the middle of the vessel. The overall flow rate of the liquid through the lower grid 14 is 9.5 gal. per minute per square foot of area. Midway between the lower grid 14 and the gas-liquid interface at the middle of the vessel the liquid flow rate is about 5.5 gal./min./sq. ft. Superficial gas velocity at the grid is about 0.22 ft./sec., and at the gas-liquid interface about 0.09 ft./sec. About 27,000 b.p.d. of liquid is withdrawn from the vessel via the liquid drawoff conduit 26 for further treatment not shown such as fractionation. The vapor phase materials are effectively separated from the liquid, passing through the demister 36 and the upper grid 32 and through the fixed catalyst bed where they are subjected to hydrogenation at the reactor vessels pressure and temperature.

As described above the apparatus and process of this invention together yield several advantages. Of these, the spherical reactor vessel allows for an economical two stage hydrotreating of a heavy hydrocarbon oil at high pressures and temperatures in an upflow "ebullated" bed process. The reactor shape provides for superior gas-liquid disengagement while still providing adequate backmixing in the "ebullated" bed hydrocracking zone. A spherical reactor is more economical to build for high pressure operation than the equivalent sized cylindrical vessel. Finally, the spherical reactor provides for a second stage fixed bed hydrogenation zone in the upper portion of the vessel.

Having fully described the invention with respect to the preferred embodiments thereof, it is intended to cover such modifications and changes thereto as would be apparent to those skilled in the art without departing from the spirit and scope of the invention.

We claim:
1. A process for the catalytic treatment of hydrocarbon oil with hydrogen comprising:
 feeding said hydrocarbon oil and hydrogen containing gas into a high pressure, high temperature zone,
 passing said hydrocarbon oil and hydrogen containing gas upwardly through a particulate catalyst bed in said zone while simultaneously rapidly decreasing the upward velocity of said oil and gas by increasing the cross sectional area of said zone as said oil and gas pass upwardly therethrough,
 removing treated hydrocarbon oil from said zone at a rate sufficient to establish an upper level of said hydrocarbon oil comprising a liquid in the area of the large cross-section of said zone,
 separating treated hydrocarbon vapor from said hydrocarbon oil above said upper level of liquid,
 contacting said hydrocarbon vapor with a second bed of solid particulate catalyst above said level of liquid in said zone, and
 withdrawing the vapor from said zone at a point above the second catalyst bed.
2. The process of claim 1 wherein said step of contacting said hydrocarbon vapor with said second bed of solid particulate catalyst, comprises passing said vapor upwardly through said second bed while simultaneously increasing the upward velocity of said vapor.
3. The process of claim 2 wherein said high pressure, high temperature zone is spherical in shape and said step of feeding said hydrocarbon oils and hydrogen containing gas into said zone comprises feeding said oil and gas into the bottom of said spherical zone.

References Cited

UNITED STATES PATENTS

| 2,379,711 | 7/1945  | Hemminger   | 208—157 |
| 2,662,091 | 12/1953 | Odell       | 208—157 |
| 2,666,526 | 11/1954 | Odell et al.| 23—288  |
| 3,183,178 | 5/1965  | Wolk        | 208—143 |
| 3,433,733 | 3/1969  | Dunn et al. | 208—163 |

HERBERT LEVINE, Primary Examiner

U.S. Cl. X.R.

23—288; 208—157